United States Patent [19]

Schultz

[11] Patent Number: 5,305,181
[45] Date of Patent: Apr. 19, 1994

[54] ARM OR WRIST MOUNTED TERMINAL WITH A FLEXIBLE HOUSING

[75] Inventor: Darald R. Schultz, Cedar Rapids, Iowa

[73] Assignee: Norand Corporation, Cedar Rapids, Iowa

[21] Appl. No.: 872,717

[22] Filed: Apr. 23, 1992

Related U.S. Application Data

[63] Continuation-in-part of PCT/US90/03282, Jun. 7, 1990, which is a continuation-in-part of Ser. No. 364,902, Jun. 8, 1989, abandoned, and a continuation-in-part of Ser. No. 812,767, Dec. 23, 1991, abandoned, and a continuation-in-part of Ser. No. 364,594, Jun. 7, 1989, abandoned, and a continuation-in-part of Ser. No. 364,904, May 15, 1989, abandoned, and a continuation-in-part of Ser. No. 674,756, Mar. 25, 1991, abandoned, and a continuaiton-in-part of Ser. No. 660,615, Feb. 25, 1991, Pat. No. 5,218,187, and a continuation-in-part of Ser. No. 816,705, Jan. 2, 1992, abandoned.

[51] Int. Cl.⁵ .............................................. G06F 1/16
[52] U.S. Cl. .................................. 361/680; 361/681; 364/708.1; 345/168
[58] Field of Search ............... 200/DIG. 2; 341/20, 341/21; 364/708, 709.11, 709.12; 340/711; 361/380, 390, 395, 399

[56] References Cited

U.S. PATENT DOCUMENTS

| | | | |
|---|---|---|---|
| 4,261,042 | 4/1981 | Ishiwatari et al. | 364/708 |
| 4,359,222 | 11/1982 | Smith, III et al. | 340/711 |
| 5,191,197 | 3/1993 | Metlitsky et al. | 235/472 |

FOREIGN PATENT DOCUMENTS

| | | | |
|---|---|---|---|
| 2445551 | 8/1980 | France | 340/711 |
| 204056 | 10/1985 | Japan | 364/708 |
| 579798 | 9/1976 | Switzerland | 364/708 |

OTHER PUBLICATIONS

Ludeman et al, Wrist Worn Terminal, IBM Technical Disclosure Bulletin, vol. 15, No. 11, Apr. 1973 pp. 3350-3351.

Primary Examiner—John Shepperd
Attorney, Agent, or Firm—McAndrews, Held & Malloy, Ltd.

[57] ABSTRACT

A hand held body for receiving, storing and transmitting information having a keyboard in the top thereof for manually entering information therein. A display is disposed on the top of such body for displaying information which has either been manually entered or scanned in or received from a base radio transceiver. A radio frequency transceiver is also disposed in the hand held body for receiving and transmitting information between the hand held body and the base radio transceiver. A scanner is provided for optically reading information and transmitting such information. A modular housing is provided for holding the scanner and a mechanism is provided for selectively attaching or detaching the housing to a bottom portion of the hand held body whereby the external portions of hand held body in the housing when attached together are small enough to be received in a shirt pocket, whereby the user can store the apparatus in such shirt pocket when not in use. A wrist, arm and finger mounted terminal/-scanner, as well as wearable belt or vest mounted battery packs and other components are shown. One of the wrist or arm mounted terminals uses a flexible housing, so it can be wrapped at least partially around a user's arm or wrist.

6 Claims, 15 Drawing Sheets

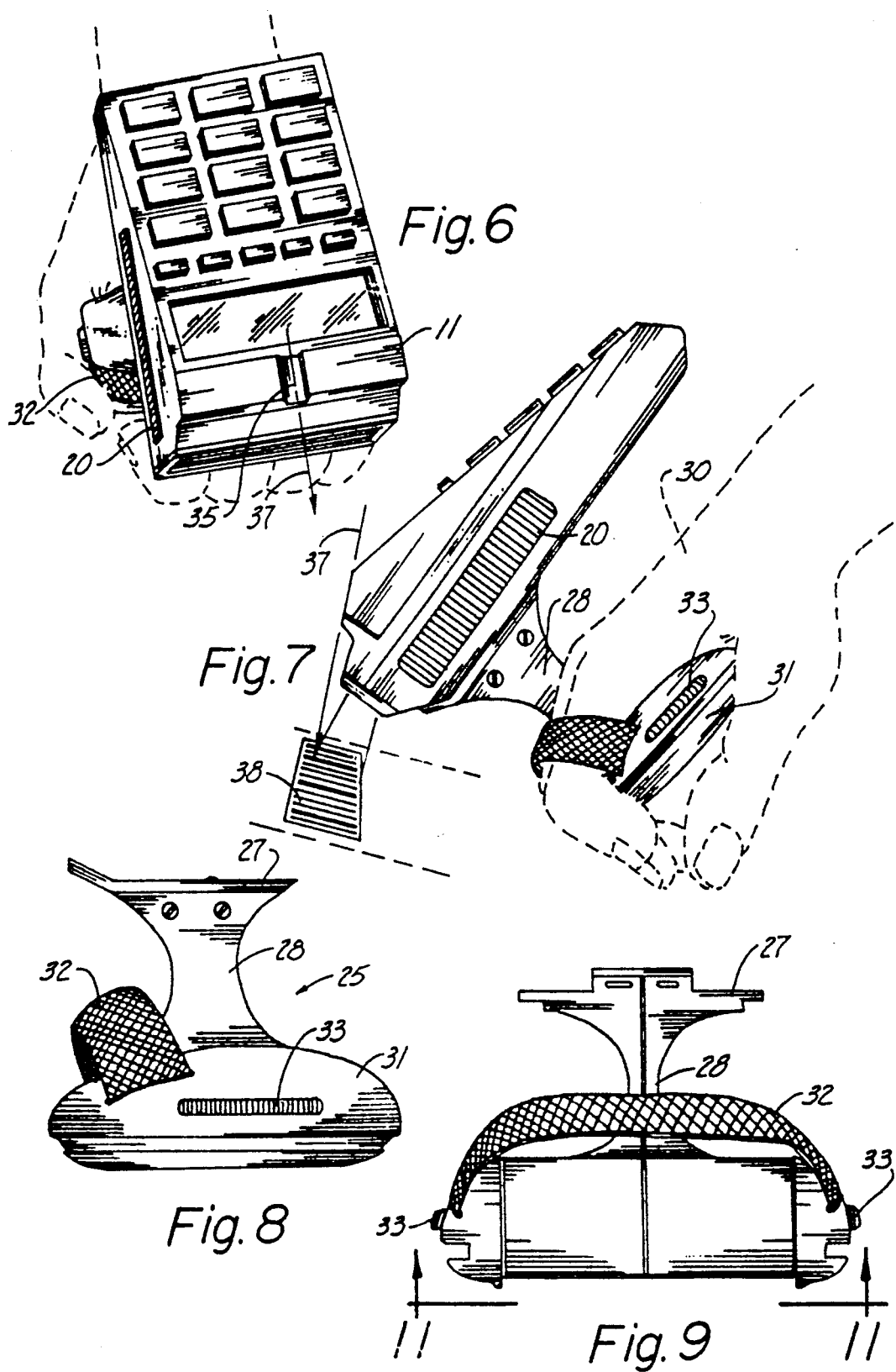

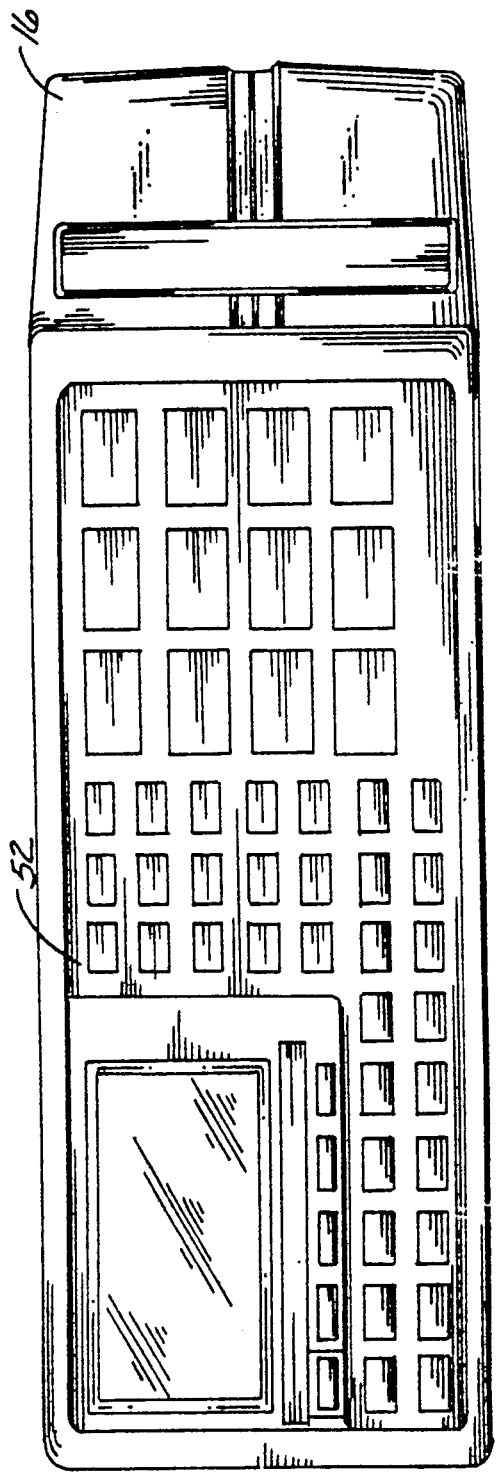
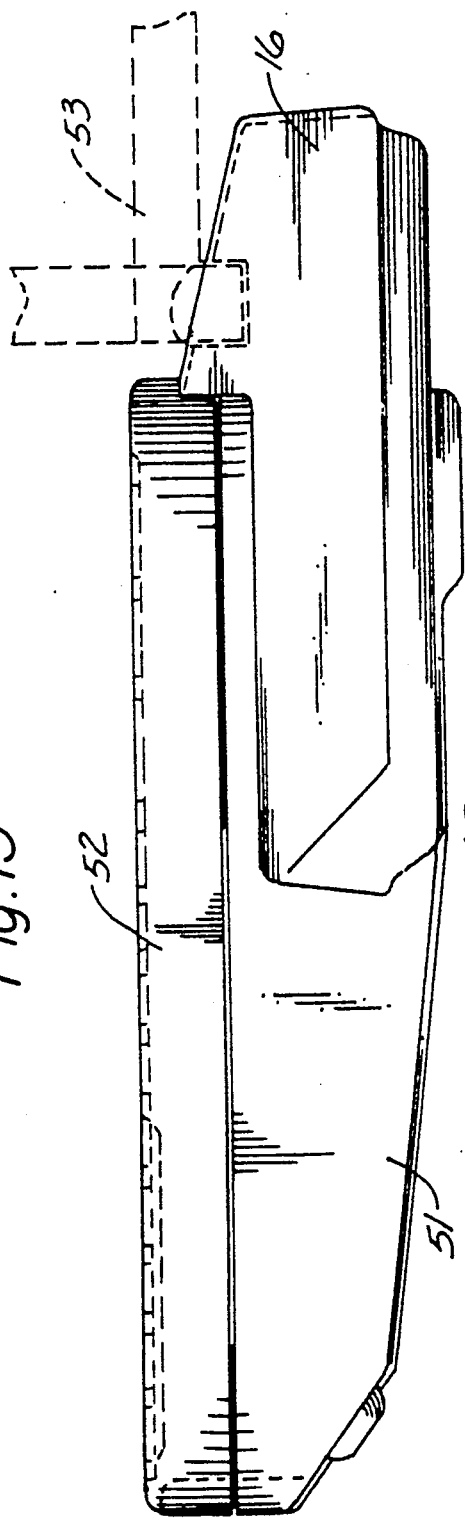
Fig. 15
Fig. 16

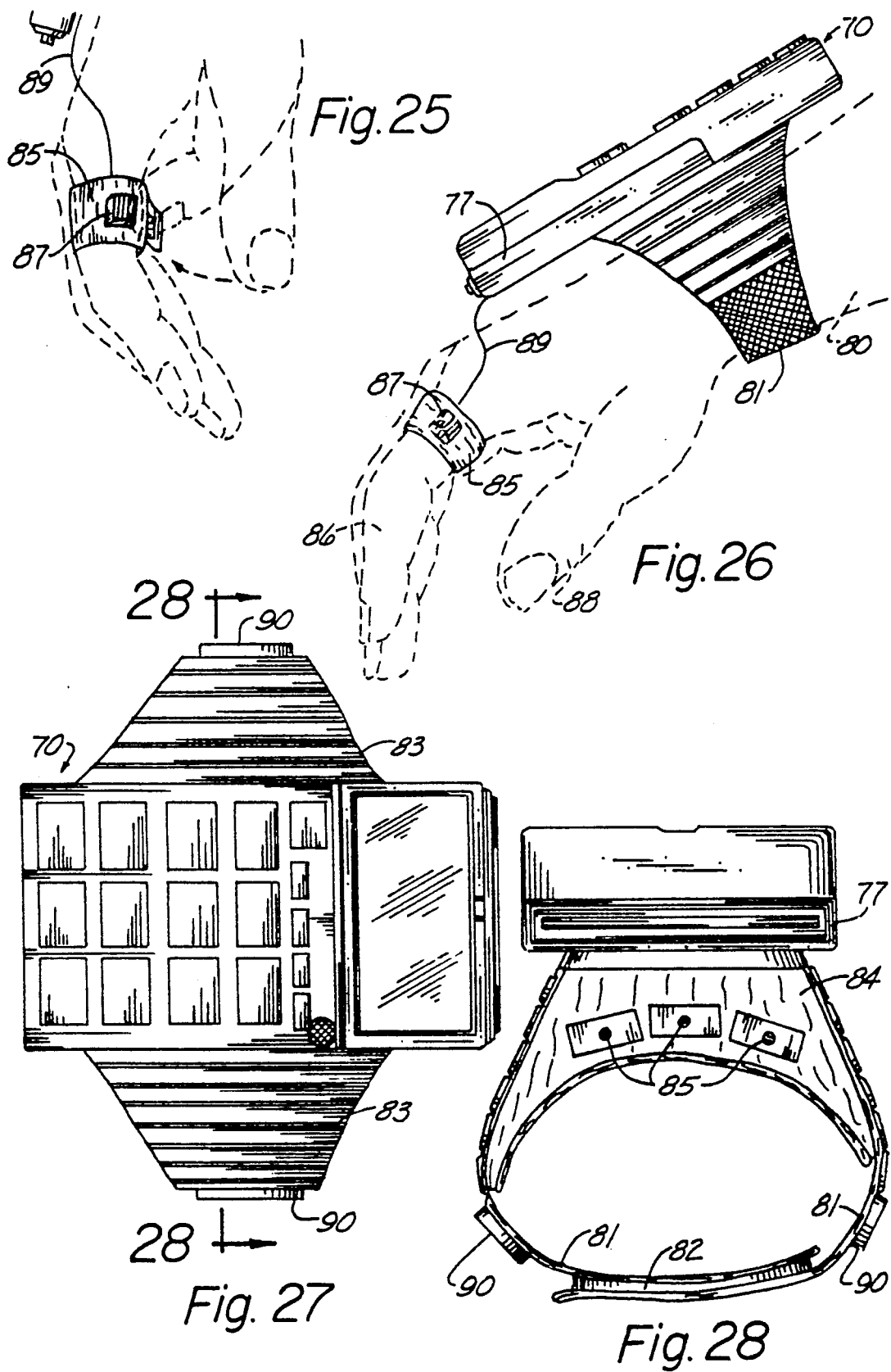

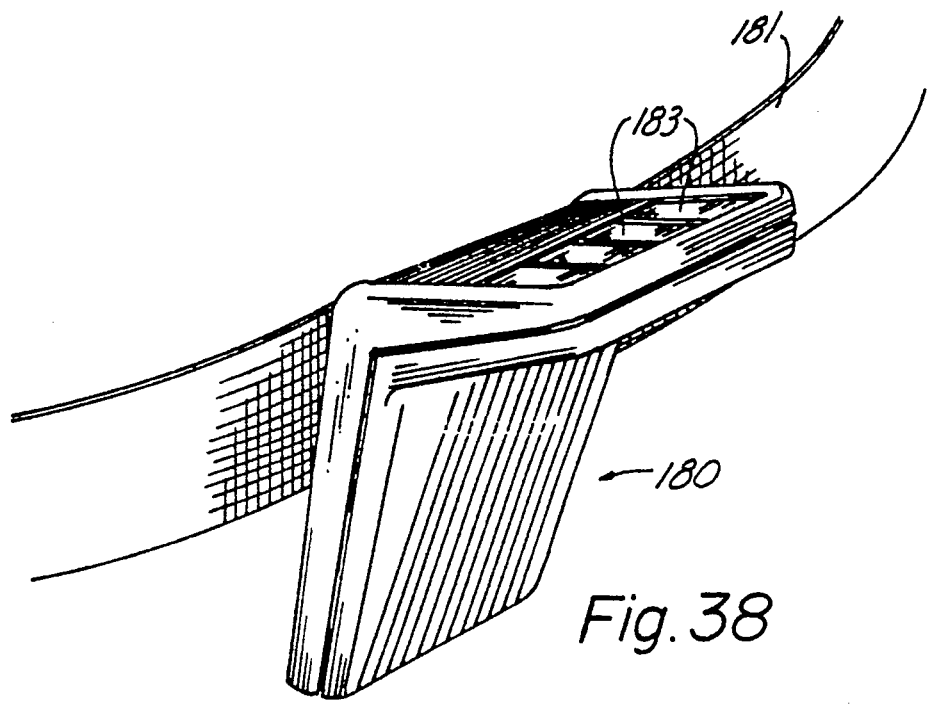
Fig. 38
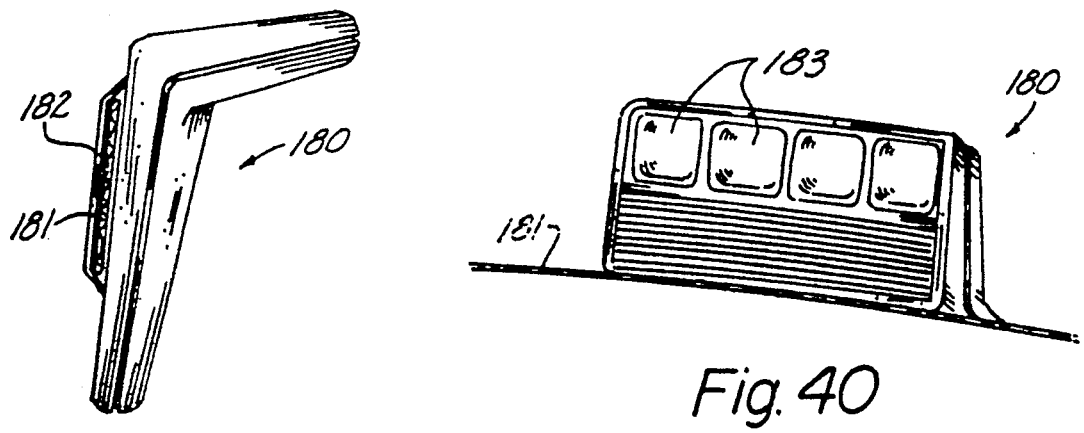
Fig. 39
Fig. 40

ARM OR WRIST MOUNTED TERMINAL WITH A FLEXIBLE HOUSING

CROSS REFERENCE TO RELATED APPLICATIONS

This application is a continuation-in-part application of PCT application PCT/US90/03282, filed Jun. 7, 1990 in the names of Darald R. Schultz et al; U.S. patent application Ser. No. 364,902 (FIGS. 11-19) now abandoned filed Jun. 8, 1989 in the names of Darald R. Schultz et al; U.S. Ser. No. 07/812,767 filed Dec. 23, 1991 now abandoned, "MODULAR SCANNER WITH HAND-HELD DATA TERMINAL" in the name of Darald R. Schultz, U.S. Ser. Nos. 07/364,594 filed Jun. 7, 1989 now abandoned and 07/364,904 filed May 15, 1989 now abandoned, both entitled "HAND-HELD DATA CAPTURE SYSTEM WITH INTERCHANGEABLE MODULES" in the names of Darald R. Schultz et al (USA National Phase of PCT/US90/03282), U.S. Ser. No. 07/674,756 filed Mar. 25, 1991 now abandoned, in the names of Darald R. Schultz et al.; U.S. Ser. No. 07/660,615 filed Feb. 25, 1991 now U.S. Pat. No. 5,218,187, and now naming Darald R. Schultz as one of the joint inventors; and U.S. Ser. No. 07/816,705, filed Jan. 2, 1992 now abandoned, "MODULAR SCANNER WITH HAND-HELD DATA TERMINAL" in the name of Darald R. Schultz et al.

INCORPORATION BY REFERENCE

The following is incorporated herein by reference:

The descriptive matter of the above-referred to PCT application PCT/US90/03282, filed Jun. 7, 1990, as published under International Publication No. WO 90/16033 on Dec. 27, 1990; U.S. Ser. No. 364,902 filed Jun. 8, 1989; U.S. Ser. No. 07/674,756 filed Mar. 25, 1991 Schultz et al.; U.S. Ser. No. 07/812,767, filed Dec. 23, 1991, "MODULAR SCANNER WITH HAND-HELD DATA TERMINAL" in the name of Darald R. Schultz, U.S. Ser. Nos. 07/364,594 filed Jun. 7, 1989 and 07/364,904 filed Jun. 8, 1989, both entitled "HAND-HELD DATA CAPTURE SYSTEM WITH INTERCHANGEABLE MODULES" in the names of Darald R. Schultz et al (USA National Phase of PCT/US90/03282), U.S. Ser. No. 07/674,756 filed Mar. 25, 1991, in the names of Darald R. Schultz et al.; U.S. Ser. No. 07/660,615 filed Feb. 25, 1991, and now naming Darald R. Schultz as one of the joint inventors; and U.S. Ser. No. 07/816,705, filed Jan. 2, 1992 "MODULAR SCANNER WITH HAND-HELD DATA TERMINAL" in the name of Darald R. Schultz et al.

TECHNICAL FIELD

The present invention relates generally to a hand held data terminal which has a flexible housing which can be attached to a user's arm or wrist.

BACKGROUND ART

In the past, hand held data terminals have been available for attachment to the wrist or arm of a user. These data terminals are uncomforatable to wear and the displays are difficult to read. Consequently, there is a need for a terminal to overcome these problems.

DISCLOSURE OF THE INVENTION

The present invention relates generally to a hand held body for receiving, storing and transmitting information having a keyboard in the top thereof for manually entering information therein. A display is disposed on the top of such body for displaying information which has either been manually entered or scanned in or received from a base radio transceiver. A radio frequency transceiver is also disposed in the hand held body for receiving and transmitting information between the hand held body and the base radio transceiver.

An object of the present invention is to provide an improved wrist or arm mounted data terminal.

A still further object is to provide a terminal mounted on a flexible frame whereby the keys and/or display can flex with regard to each other for the comfort of the user.

Other objects, advantages, and novel features of the present invention will become apparent from the following detailed description of the invention when considered in conjunction with the accompanying drawings.

BRIEF DESCRIPTION OF THE DRAWINGS

FIG. 6 is a perspective view of the apparatus generally shown in FIG. 1, shown in the process of scanning a bar code;

FIG. 7 is a side elevational view of the apparatus as used in FIG. 6 but showing the process of aiming the device toward a bar code with the gripping device attached thereto;

FIG. 8 is a side elevational view of the gripping device shown in FIG. 7;

FIG. 9 is a front view of the gripping device shown in FIGS. 7 and 8;

FIG. 15 is a top plan view of the hand held data terminal of FIG. 12, having the modular scanner of the present invention attached thereto;

FIG. 16 is a side elevational view of FIG. 14, showing an optional antenna in dashed lines;

FIG. 25 is a view of a trigger for activating a scanner or the like shown on a hand in dashed lines and which is connected by a wire to the hand held data terminal;

FIG. 26 is a side elevational view of the hand held data terminal of FIG. 18 shown attached to the wrist of a hand and arm with a trigger mechanism attached to one finger of such hand;

FIG. 27 is a top plan view of the apparatus shown in FIG. 25;

FIG. 28 is a cross sectional view taken along line 27—27 showing how batteries are stored in the structure which attaches the hand held data terminal to the wrist;

FIG. 38 is a perspective view of a combined battery pack, computer and radio frequency link device;

FIG. 39 is a side view of the FIG. 38 device; and

FIG. 40 is a top view of the FIG. 38 device.

BEST MODE FOR CARRYING OUT THE INVENTION

Figure 1:
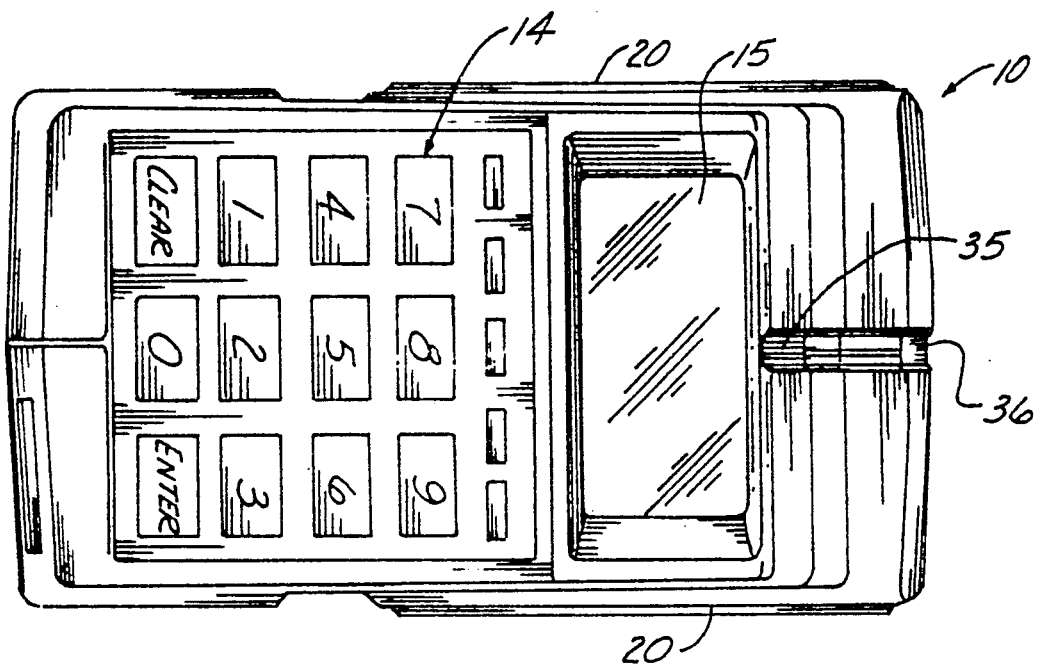
FIG. 1 is a top plan view of a preferred embodiment of the present invention showing a hand held data terminal having a modular scanner attached thereto.
Figure 2:
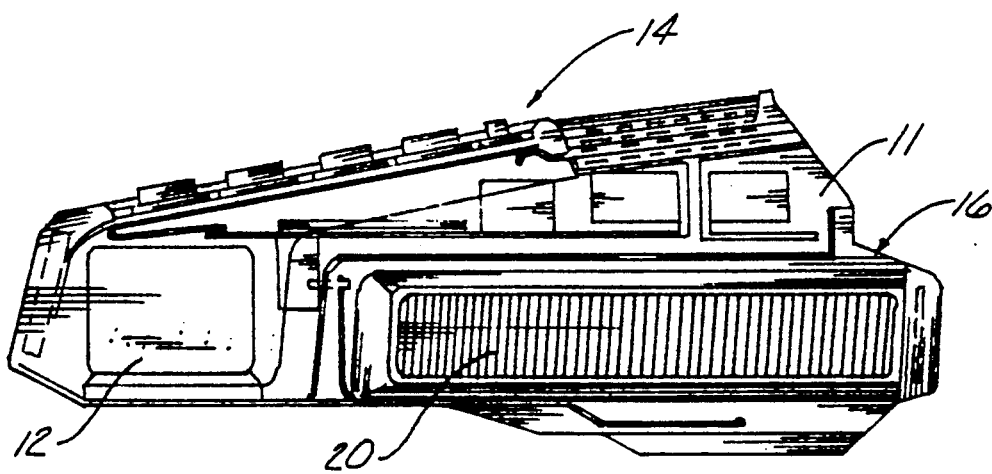
FIG. 2 is a side elevational view of the apparatus of FIG. 1.
Figure 3:
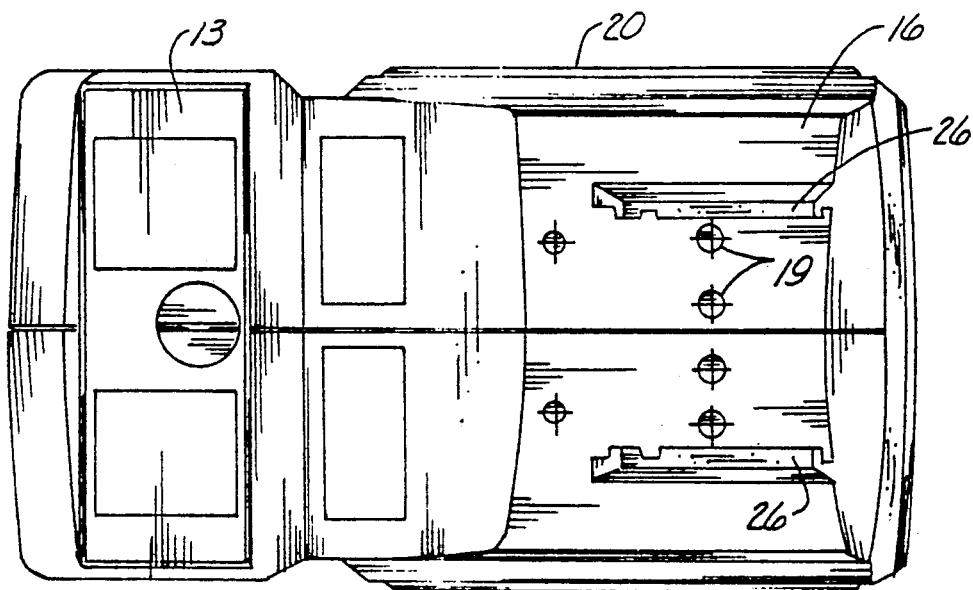
FIG. 3 is a bottom view of the embodiment of FIG. 1.

Referring now to the drawings wherein like reference numerals designate identical or corresponding parts throughout the several views, FIG. 1 shows a hand held data terminal (10) constructed in accordance with the present invention and having a body (11). The body (11) has a battery compartment (12) with a removable battery compartment door (13) as shown in FIG. 3. A keyboard (14) and a display (15) are attached to the body (11) as shown in FIGS. 1 and 2.

Figure 4:
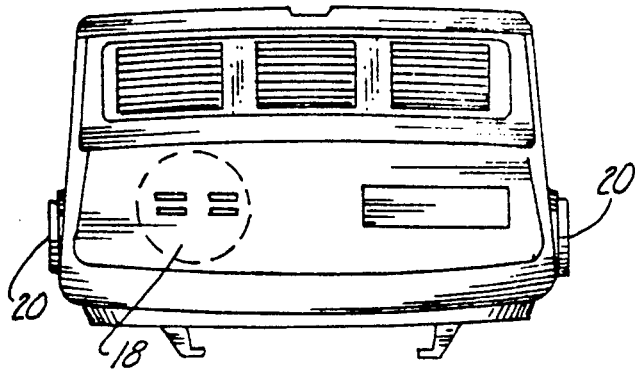
FIG. 4 is a view from one end of the apparatus of FIG. 1.
Figure 5:
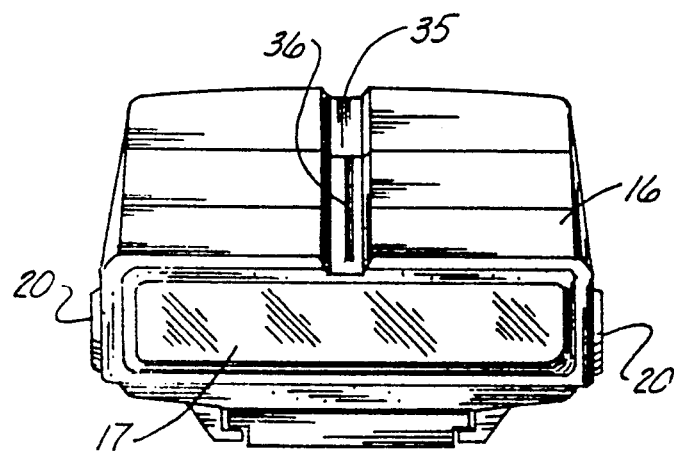
FIG. 5 is a view of the front end of the apparatus of FIG. 1 showing the scanner and aiming device associated therewith.

A modular scanner (16) is provided, which can be of a laser or CCD type. A front laser window (17) is shown in FIG. 5. The housing (11) has a speaker (18), shown in FIG. 4 which can provide an audio signal for various occurrences which can be programmed into the hand held data terminal (10).

Elements (19) on the bottom of the housing (16) of the modular scanner can be either metal contacts for providing electrical contact to recharge the batteries within the battery compartment (12) and/or to communicate information, or they can be optical interfaces for communicating information through optical lines or they can be a combination of metal electrical contacts and optical interfaces.

Triggers (20) on each side of the housing (16) can be utilized to actuate the scanner within housing (16). These triggers (20) are disposed on each side of the housing (16) so that they can be actuated with the thumb of either a right hand user or a left hand user and furthermore, they extend almost the entire length of the housing (16) so that regardless of where the housing (16) is grasped, the thumb of the hand grasping the housing can easily access a trigger (20).

Referring to FIGS. 6–10, it is noted that a gripping device (25) is shown for attachment to the bottom of housing (16) by flanges (26) integrally attached thereto. Portion (27) on pedestal (28) slides in and under the flanges (26) on housing (16) so that contacts or optical interfaces (29) on member (27) will operably connected with contacts or optical interfaces (19) on the bottom of housing (16). Once the housing (16) and the grip (25) are connected together as is shown in FIG. 7, a hand (30) as shown in FIG. 7 in dashed lines can grasp the base (31) and have the pedestal (28) between the fingers of the hand (30) such that an elastic member (32) will bias the fingers of the hand (30) towards the enlarged portion (31) of the gripping device (25). A secondary trigger (33) is disposed on each side of the enlarged portion (31) of the gripping device (25) and this can also be used to actuate the scanner within the housing (16) instead of actuating the scanner with triggers (20), or, alternatively, the buttons (33) can be used as function buttons to be programmed by the user.

Figure 11:
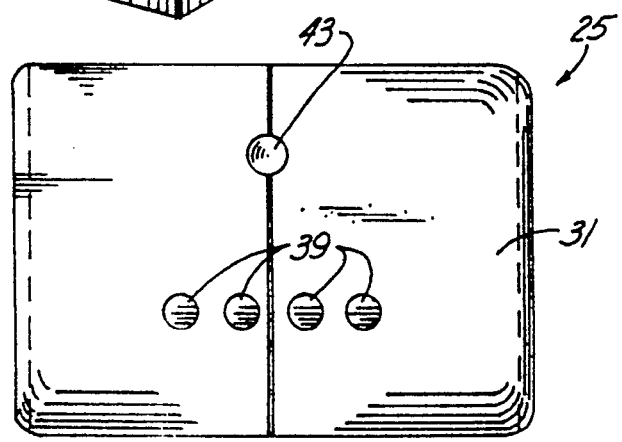
FIG. 11 is a bottom view of the gripping device taken along line 11—11 of FIG. 9.

FIG. 11 shows the bottom of the gripping device (25) and shows electrical contacts or optical interfaces (39) which are connected directly to respective contacts or optical interfaces (29).

A docking device (40) has contacts for optical interfaces (49) thereon for contacting or interfacing with contacts or interfaces (39) in the bottom of the gripping device (25). Projections (41) on the top of the docking device (40) extend into grooves (42) in the lower portion (31) of gripping device (25) so that the gripping device (25) can be slid into the docking device (40) from either side thereof until the upwardly biased ball bearing (42) extends into the depression (43) in the bottom of the enlarged portion (31) of the gripping member (25). When the gripping device (25) is in such a position, the docking device is capable of charging the battery within the battery compartment (12) and/or transferring information to and from the hand held data terminal (10) and a base computer or the like. Stops (not shown) can also be provided on docking device (40) to permit the gripping device (25) to be attached thereto from only one side, for example, and for it to automatically stop so that the contacts or optical interfaces (39) and (49) are in alignment when the stops are contacted.

Referring to FIGS. 6 and 7, it is noted that a groove (35) is disposed in the top of the body (11), and referring to FIGS. 1 and 5, it is noted that a continuation of the groove (36) is disposed in the housing (16) of the scanning module so that the user can slide down the arrow (37) shown in FIGS. 6 and 7 toward a bar code (38).

Figure 10:
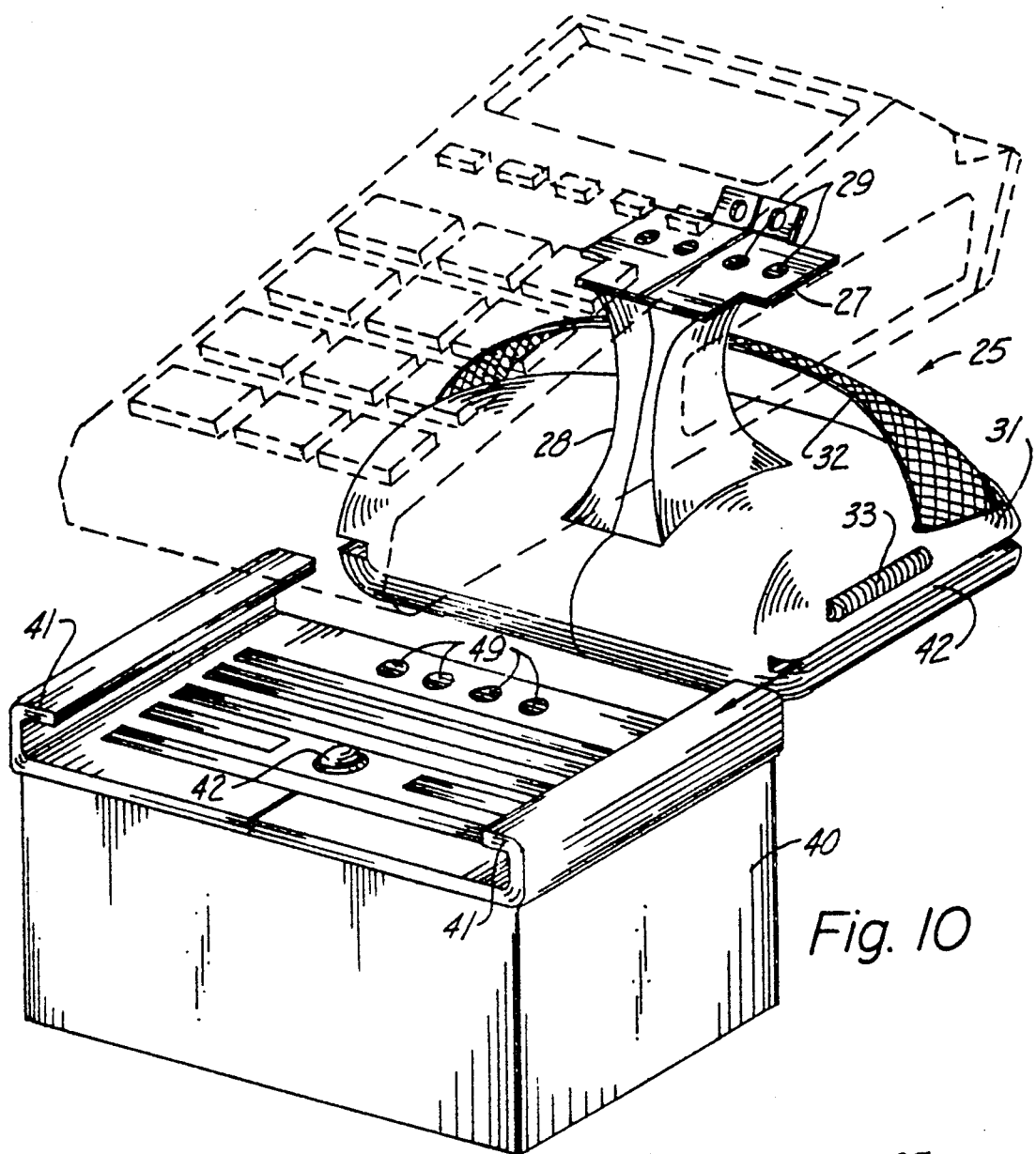
FIG. 10 is a perspective view of the gripping device shown in association with a docking device and also showing the hand held data terminal with a modular scanner shown in dashed lines.

Referring to FIGS. 8, 9 and 10, it is noted that the enlarged portion (31) also can contain a battery pack (not shown) or the like for supplying auxiliary power to the hand held terminal (10). This battery pack is also rechargeable.

Referring now to FIGS. 12, 13, 14, 15 and 16, it is noted that the scanner including housing (16) has been removed from the body (11) and has been reattached to a different body member (51) having a keyboard and display device (52) attached thereto. The scanning module (16) shown in FIG. 16 alternatively has a radio frequency antenna (53) attached thereto which is shown in dashed lines in two of the possible positions thereof.

Figure 12:
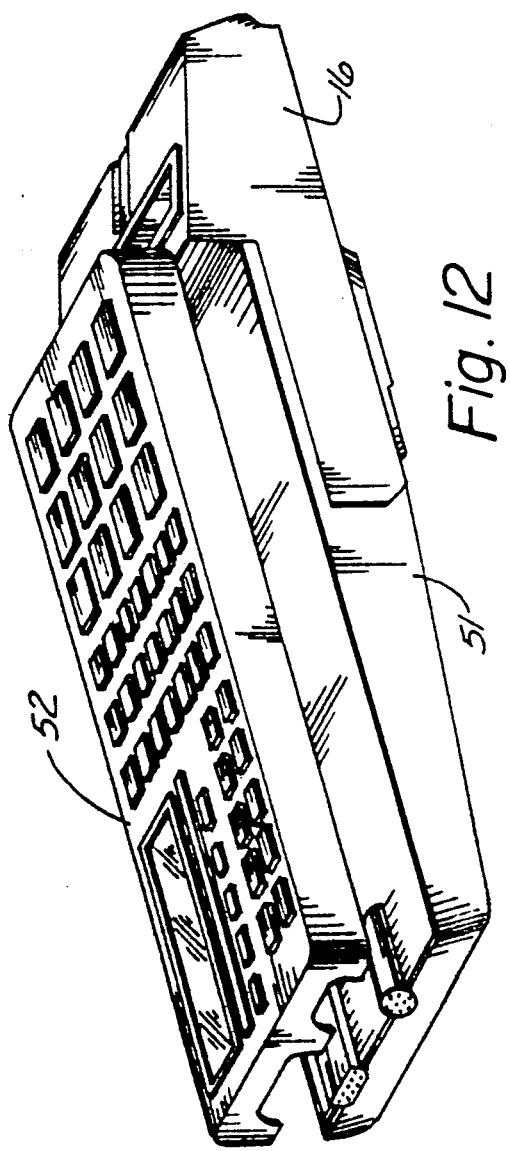
FIG. 12 is a perspective view of the modular scanning device shown attached to a larger hand held data terminal having an interchangeable and display apparatus associated therewith.
Figure 14:
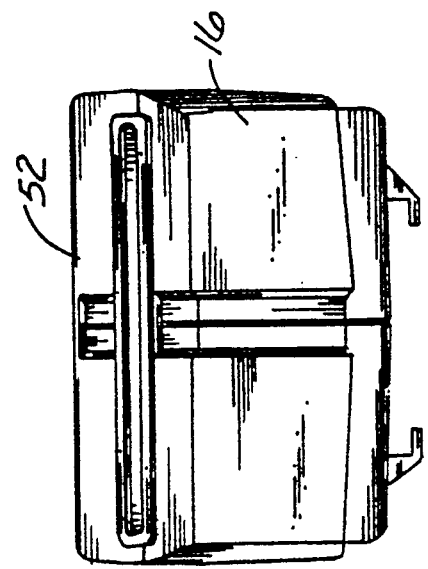
FIG. 14 is a view of the other end of such apparatus of FIG. 11.
Figure 13:
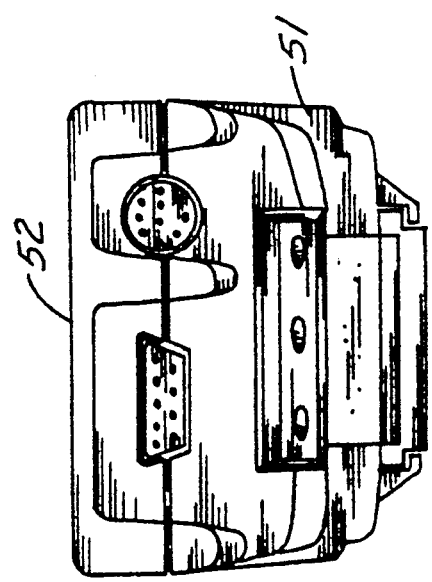
FIG. 13 is a view of one end of the apparatus in FIG. 12.
Figure 17:
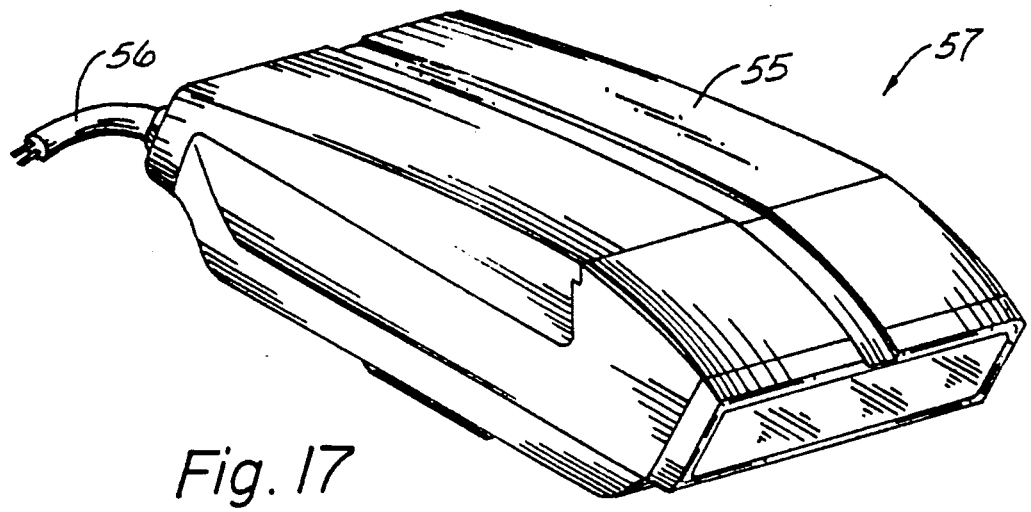
FIG. 17 is a perspective view of a tethered scanner utilizing the modular scanning unit which is also used in the FIG. 1, FIG. 12 embodiments shown herein.
Figure 18:
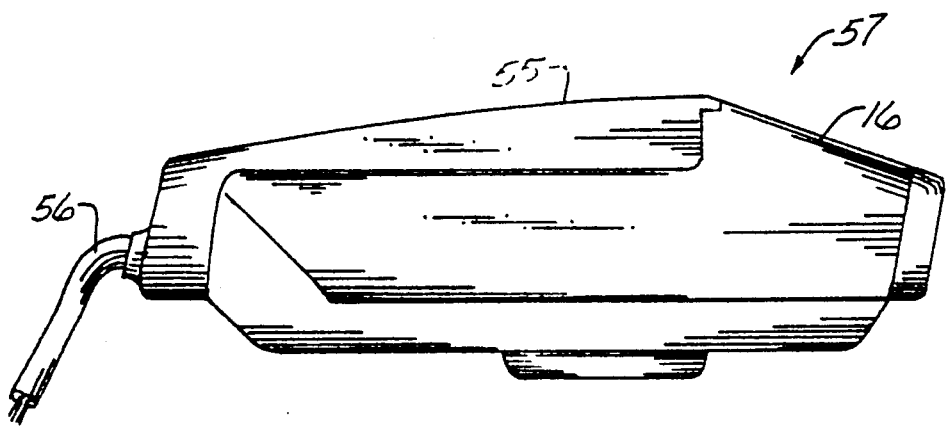
FIG. 18 is a side elevational view of the tethered scanning unit shown in FIG. 16.

Referring now to FIGS. 17 and 18, it is noted that the housing (16) which constitutes the scanning module has been removed from the hand held terminal of either FIG. 1 or FIG. 12 and has been reattached to a body member (55) tethered by a cord (56) to a terminal whereby the scanner (57) formed by these members can be used simply as a scanner and not be used necessarily with an integral hand held data terminal.

Figure 19:
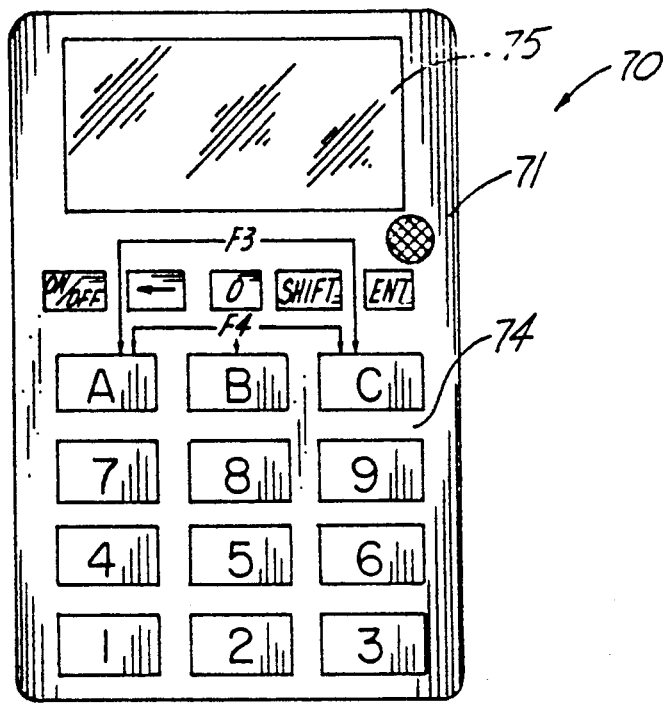
FIG. 19 shows a top plan view of still another hand held data terminal.
Figure 20:
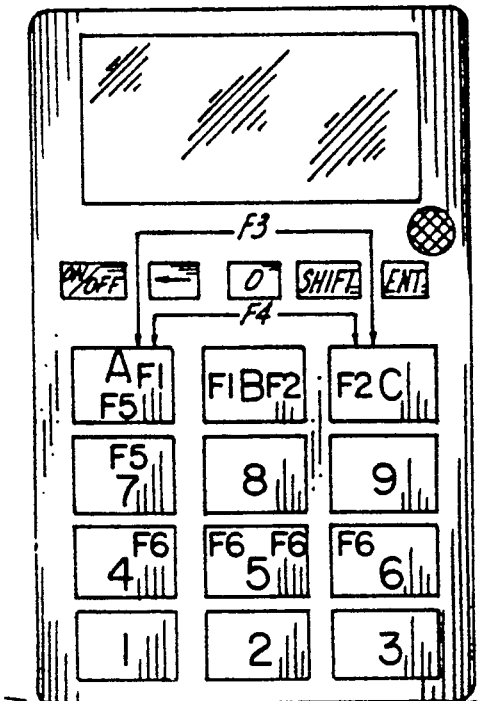
FIG. 20 shows another view of the hand held data terminal and shows how it would fit into a shirt pocket with the shirt pocket being shown in dashed lines of FIG. 20.

FIG. 19 shows another alternative, similar to that shown in the previously filed Cargin U.S. patent application Ser. No. 07/782,931 filed Oct. 25, 1991, which is incorporated herein by reference. A hand held data terminal (70) having a housing (71), keyboard (74) and display (75) is more rectangular in shape than the hand held terminal of the FIG. 1 embodiment. The hand held data terminal (70) is shown in FIG. 20 in combination with a pocket (76) shown in dashed lines in FIG. 20 of a shirt. The hand held data terminal (70) is shown and constructed to be small enough to fit into such pocket (76) of an average size men's dress shirt, the pocket being of a size in the range of 3.5 to 5.5 inches deep and 4 to 5 inches wide.

Figure 21:
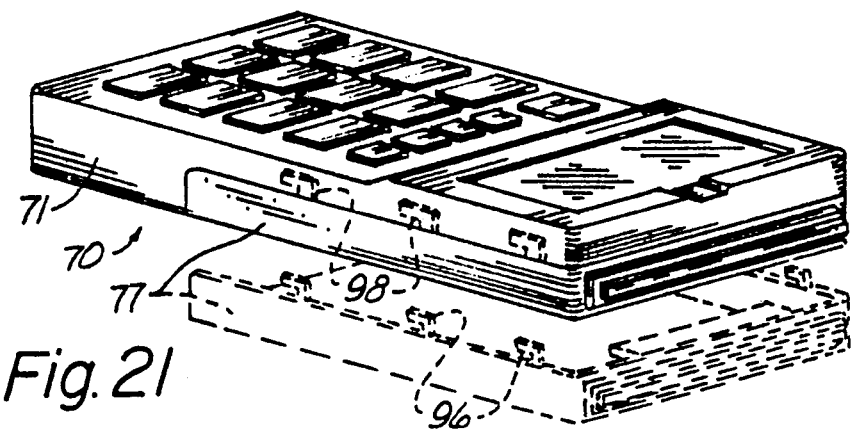
FIG. 21 is a perspective view of the apparatus of FIGS. 19 and 20 showing in dashed lines how the modular scanning unit can be removed therefrom.
Figure 22:
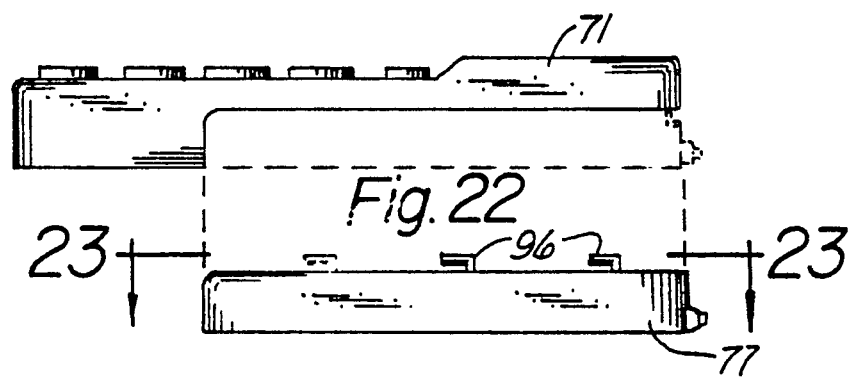
FIG. 22 is a side elevational view of the apparatus of FIG. 19 showing the modular scanning unit removed.

FIG. 21 shows the hand held data terminal (70) with a different modular scanner (77) attached thereto, FIG. 21 showing in dashed lines the scanner before it is attached to the body member (71). Attachment mechanism (96) can be the same as attachment mechanism (56) shown in U.S. patent application Ser. No. 674,756 filed Mar. 25, 1991, which is incorporated herein by reference. Complementary openings (98) in body (71) receive and hold mechanism (96).

Figure 23:
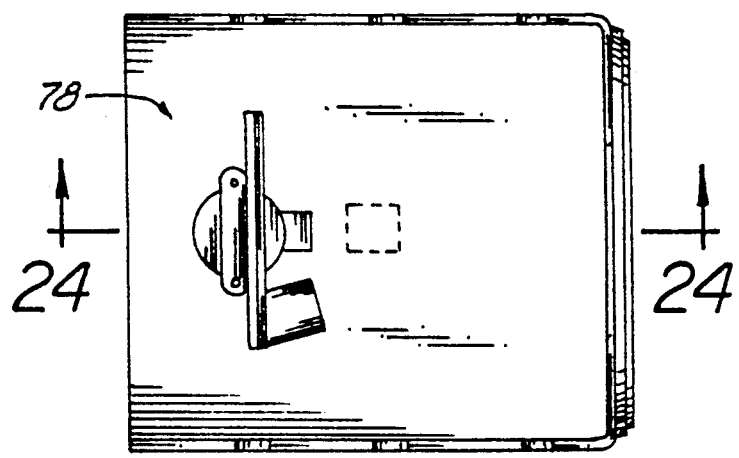
FIG. 23 is a top view of the scanning unit taken along line 22—22 of FIG. 21.
Figure 24:
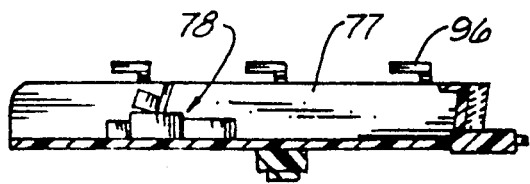
FIG. 24 is a cross sectional view of the scanning unit taken along line 24—24 of FIG. 23.

FIGS. 23 and 24 show a laser scanner (78) which forms the engine for the laser scanner disposed within the housing (77). Of course, it is possible to use a CCD scanner instead of the laser scanner (78) if desired.

Referring now to FIGS. 25-28, it is noted that the hand held data terminal (70) with the laser scanner housing (77) attached thereto is secured to the wrist (80) of the user by a Velcro strap (81) having hook and loop sections (82) disposed thereon as is shown in FIG. 28. The straps (81) are connected to a section (83) having a filler (84), such as foam rubber, for holding rechargeable batteries (185) therein. These rechargeable batteries (85) can either be the primary supply of power for the hand held data terminal (70) or they can provide auxiliary power, either to supplement with or to switch over to in case of power failure within the hand held data terminal (70).

A ring like member (85) is attached to one of the fingers (86) of the hand of the user, although it is to be understood that this ring (85) could go around more than one finger if desired. A trigger (87) on the ring (85) when pushed by the thumb (88), will actuate the scanner within the housing (77). The triggers (90) are wired in parallel with trigger (87). This trigger (87) is connected to the scanner (77) by a cord (89) which leads from the trigger (87) to the scanner (77). Alternatively, triggers (90) on straps (81) as shown in FIG. 28 can be utilized to actuate the scanner within the housing (77).

Figure 29:
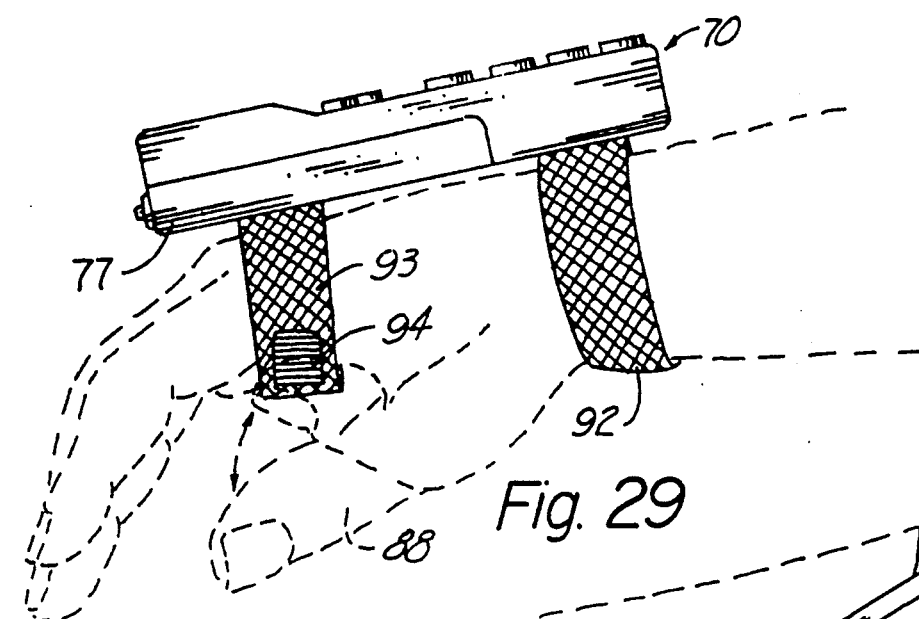
FIG. 29 shows a cloth strap/Velcro attaching mechanism for attaching a hand held data terminal of FIG. 19 to the back of the user's hand and having a trigger mechanism provided within easy access of the thumb of the same hand onto which the hand held data terminal is attached.

Referring now to FIG. 28, it is noted that the hand held data terminal (70) with scanner housing (77) attached thereto is attached to the wrist of a user by cloth or elastic straps (92). If these straps are non-elastic, then they will also have Velcro, hook and loop fasteners, similar to the Velcro (82) shown in FIG. 28. Similarly, cloth or elastic straps (93) extend over the palm of the hand shown in dashed lines in FIG. 29 and this connection can also be made by using Velcro if desired. A trigger (94) attached to the strap (93) is wired through a wire in strap (93) (but not shown in FIG. 29) and leads to the scanner within housing (77) such that the thumb (88) of the user can actuate the scanner within housing (77) by pushing on the trigger (94).

Figure 30:
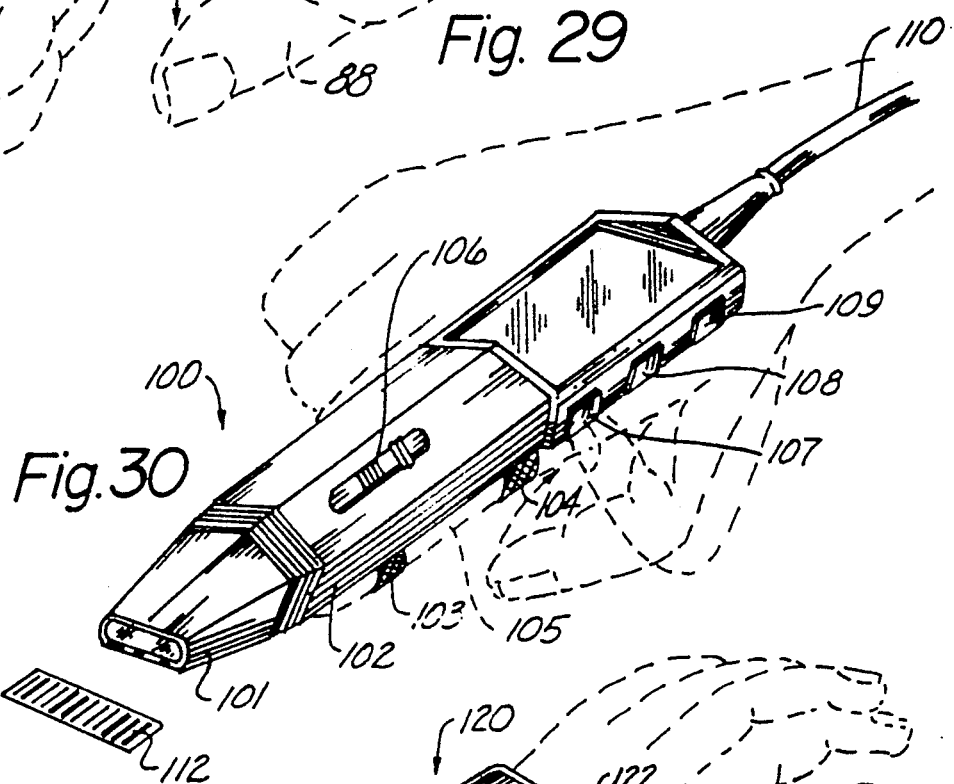
FIG. 30 is a perspective view of a finger mounted scanner and terminal with display and control buttons.

Referring to FIG. 30, scanner (100) is a finger mounted device including scanner section (101) which is either a laser scanner or a CCD type scanner for reading a bar code (112) or the like. Housing portion (102) has elastic or Velcro straps (103) and (104) for attaching to a person's finger (105). An on/off switch (106) is provided on housing (102) and function buttons (107), (108) and (109) are provided for various reasons. Typically, the button (107) is thumb-actuated for initiating the scanning of bar code (112). Also, a duplicate number of buttons (107), (108) and (109) are provided on the opposite side of the housing (105) so that it can be readily used by either the right hand or the left hand. The scanner (102) can be connected by cord (110) to a fuller functioning terminal or it can be in radio frequency contact with either a terminal, a printer or a host computer.

Figure 31:
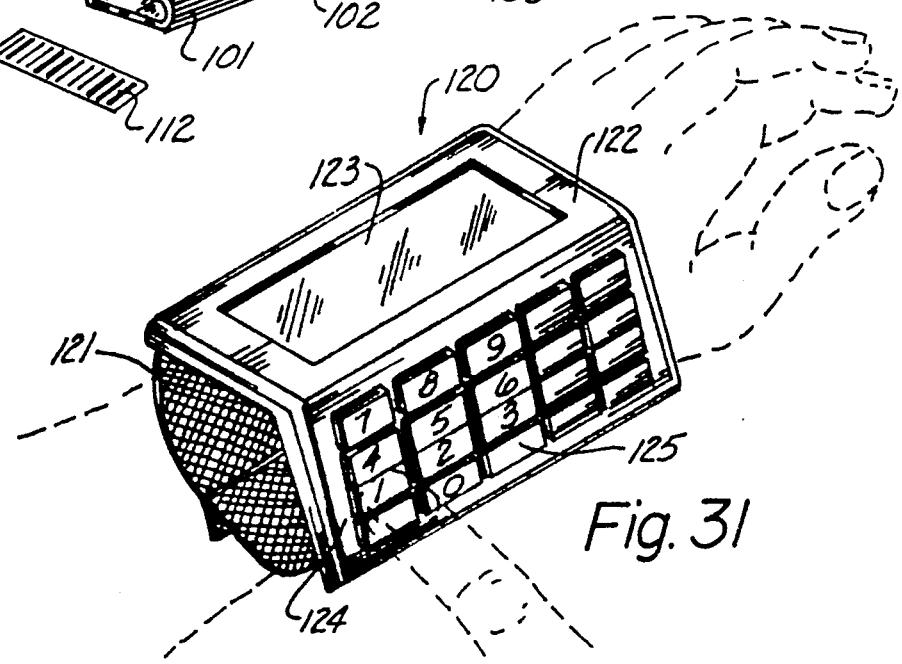
FIG. 31 is a perspective view of a wrist or arm mounted terminal having the display disposed in a different plane than the keyboard.

Referring now to FIG. 31, an arm or wrist mounted terminal (120) is operably attached by a pair of flexible straps (121) which can be elastic or can be a pair of straps having mated Velcro on the ends thereof. One top surface (122) of the terminal (120) has a display (123) thereon and another surface (124) of the housing terminal (120) has a plurality of keys (125) thereon. This arrangement of having the display at an angle with respect to the buttons (125) permits the display to be easily readable and yet have the buttons easily accessible without the need to be being a contortionist.

Figure 32:
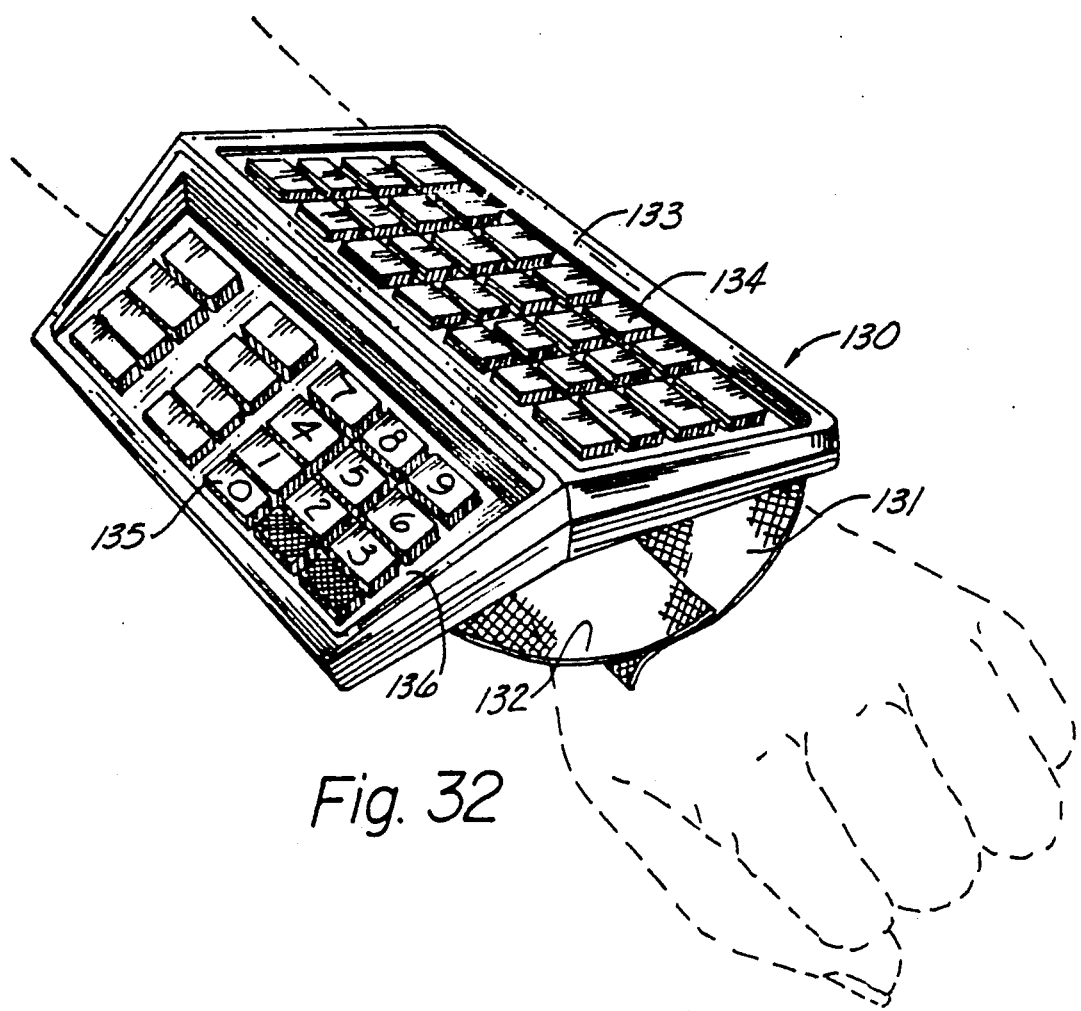
FIG. 32 is a perspective view of another wrist mounted terminal.
Figure 33:
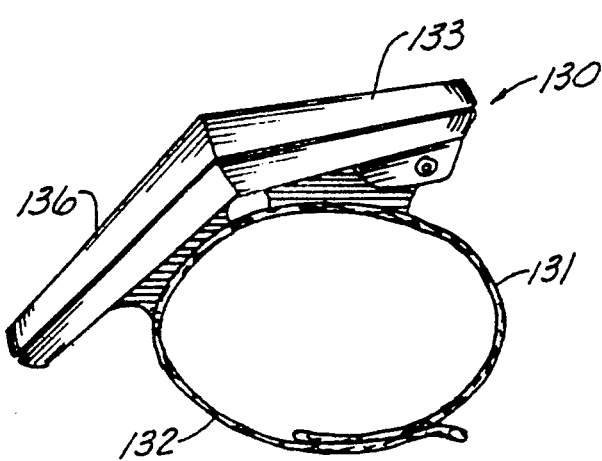
FIG. 33 is a side view of the wrist mounted terminal of FIG. 32.

FIG. 32 shows a wrist or arm mounted terminal (130) having a pair of straps with one side (131) with Velcro on one end and the other mating strap (132) with Velcro thereon so that when they are pressed together in the manner shown in FIG. 33, the device is held onto the wrist, and of course as is well known with Velcro structure, it can easily be released when the terminal (130) is to be removed.

In a fashion similar to the terminal (120), the terminal (130) has a first set of keys (134) mounted on a first surface (133) and a second set of keys (135) mounted on another surface (136) which is disposed at an obtuse angle with respect to the surface (133).

Figure 34:
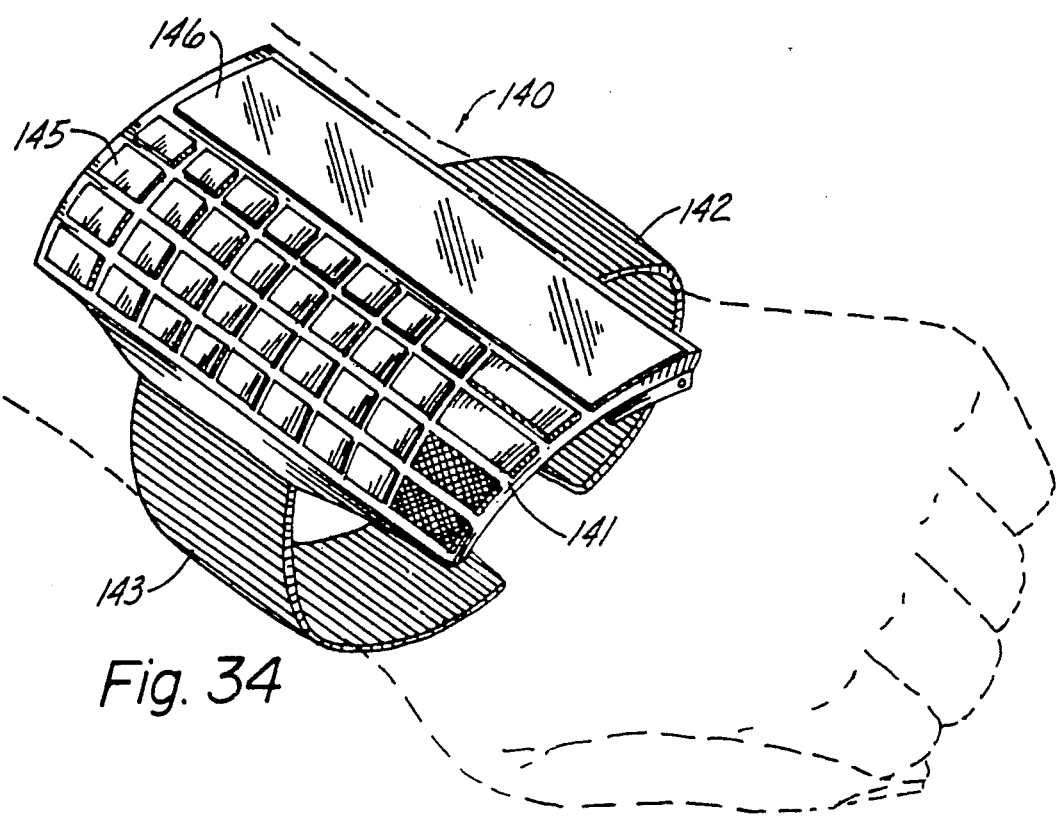
FIG. 34 is a perspective view of a terminal having the keys and display mounted to a flexible frame which will conform to a user's wrist.

Referring now to FIG. 34, a wrist mounted terminal (140) includes a flexible frame (141) which can be of any flexible material but might, for example, be of a flexible polyvinyl chloride with the components of the terminal embedded therein, whereby the terminal body (141) can flex to conform to the shape of the user's wrist or arm when attached by a strap having two flexible portions (142) and (143) affixed to the flexible frame (141). Function buttons (145) can be utilized just like any other terminal having a rigid housing or frame. A display (146) is also mounted to the flexible frame (141).

Figure 35:
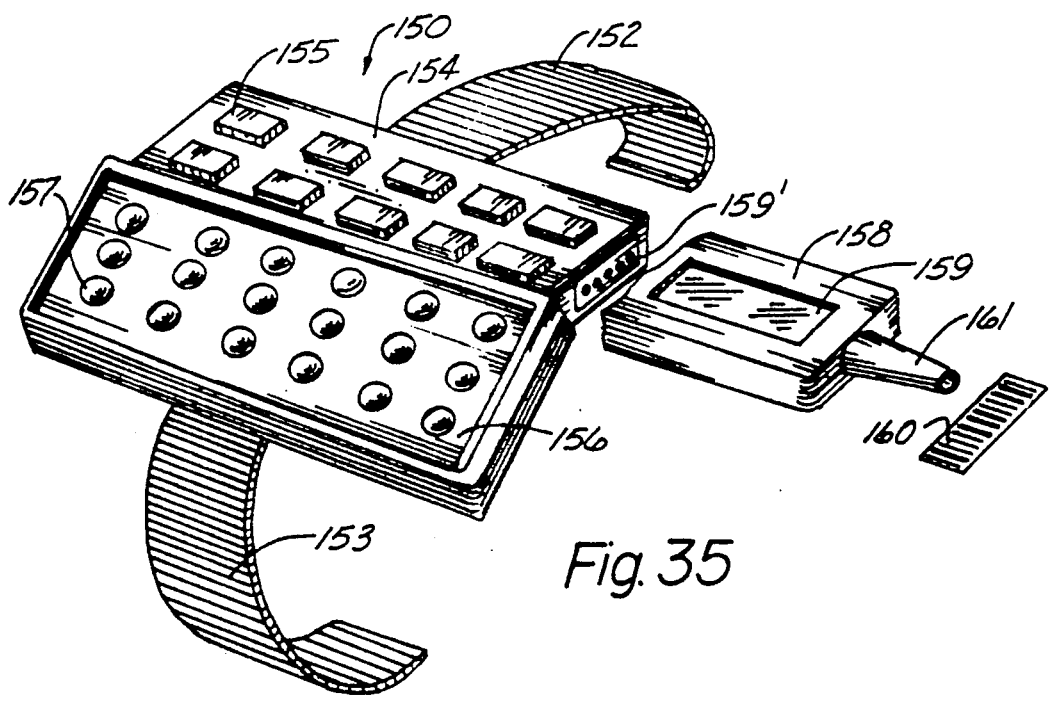
FIG. 35 is a perspective view of a terminal having keys in two planes and a detachable scanner/display all for being worn on the wrist or arm.

Referring now to FIG. 35, terminal (150) is shown having a first strap (152) and a second strap (153) which are interconnectable by Velcro fasteners (not shown). A first housing portion (154) has buttons or keys (155) thereon and a second housing portion (156) has buttons or function keys (157) disposed thereon.

A modular scanner or bar code reader (158) plugs into the portion (154) of terminal (150) and is shown by the plug connector (159). The bar code reader or scanner (158) has a display (159) disposed therein which will read out either what has been scanned or what has been entered by the keys (155) or (157). The bar code (160) can of course be scanned or read using the scanner or reader (158) by moving the arm so that portion (161) of the scanner or reader (158) points toward the bar code (160).

Figure 36:
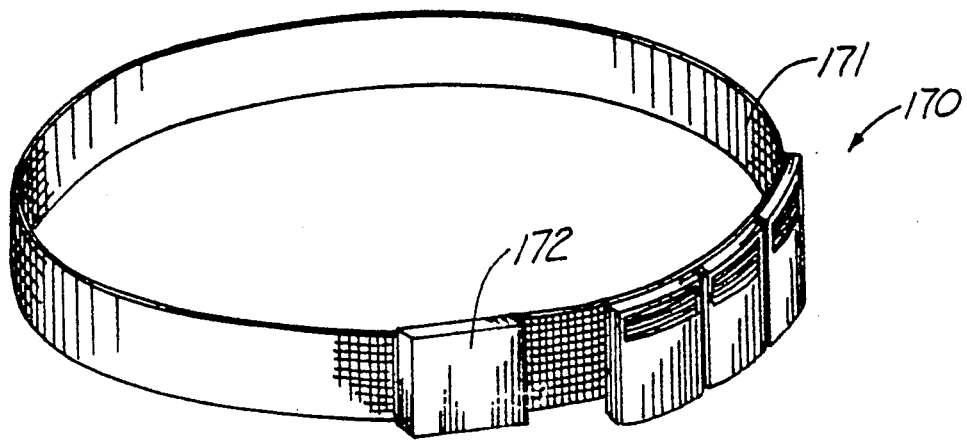
FIG. 36 is a perspective view of a belt mounted modular rechargeable battery pack.
Figure 37:
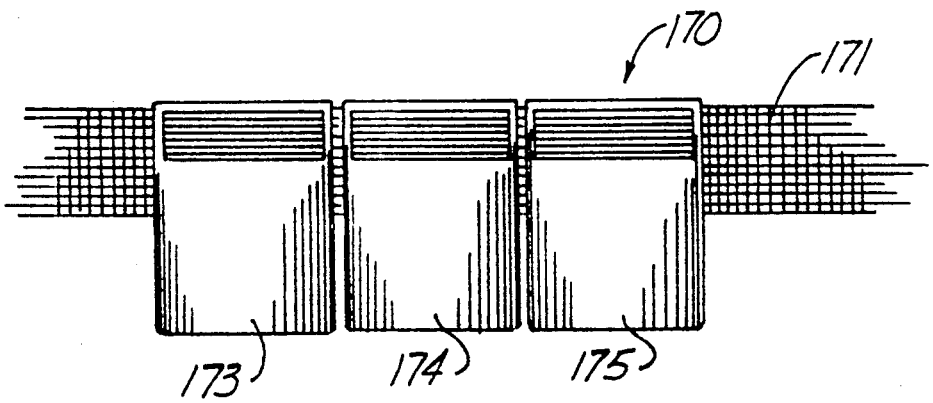
FIG. 37 is a front, enlarged view of the FIG. 36 battery pack.

FIG. 36 shows a plurality of battery packs (170) attached by a belt loop to a belt (171). A conventional belt buckle (172) is also shown. These battery packs (170) are individually referred to as battery packs (173), (174) and (175) and have a flexible interconnect therebetween so that they will conform to the user's belt. A major purpose of the battery pack arrangement (170) is to make the heavier parts of computer terminals, scanners, printers, etc., wearable by the user so that the hand-held terminals, scanners, bar code readers, etc., can be made to be much lighter in weight and therefore, easier to use and producing less fatigue. The flexible battery pack (170) is of course rechargeable and could be mounted on a vest or other wearable apparel.

Referring to FIGS. 38-40, a snap-on battery pack (180) is shown which is also rechargeable and a belt (181) can extend through a loop (182) therein. The device (180) can also include an intelligent computer device and radio frequency communication to a smaller hand-held terminal of lower intelligence (not shown). Function keys (183) are useful for controlling the computer within the modular device (180). This is also for the purpose of putting the heavier weight terminals into a wearable fashion so that the hands of the user are free or only have lighter components, which will prevent fatigue. The devices can be activated by voice or can be a duplex arrangement where the device responds also with a voice message.

Accordingly, it will be appreciated that the objects referred to above are indeed accomplished by use of the embodiments described herein. Obviously, many modifications and variations of the present invention are possible in light of the above teachings. It is therefore to be understood that, within the scope of the appended claims, the invention may be practiced otherwise than as specifically described.

I claim:

1. Apparatus comprising:
    a flexible housing means for conforming to the shape of a users body part to which it is to be attached, said housing having a top side and a bottom side;
    terminal means operably attached to said flexible housing means for receiving and storing information;
    key means operably attached to said flexible housing whereby flexing of said housing will move some of said key means with respect to other parts of said key means;
    display means operatively attached to the top side of said flexible housing means and extending above said top side for displaying information from said terminal means; and
    means for operatively attaching said flexible housing means to a user's wrist or arm whereby said flexible housing means will be held wrapped at least partially around the user's wrist or arm.

2. The apparatus of claim 1 wherein said key means is disposed on the top side of said flexible housing means extending above the top side of said flexible housing means by a substantial distance.

3. The apparatus of claim 2 wherein said substantial distance is approximately the same as the thickness of said housing means.

4. The apparatus of claim 3 wherein said display means extends above said top side of said flexible housing means at least as far as the top of said key means.

5. The apparatus of claim 4 wherein said display means extends substantially entirely across said flexible housing means.

6. The apparatus of claim 5 wherein said display means is substantially wider than the width of said attaching means and extends to both sides of said attaching means.

* * * * *